(12) United States Patent
Waylett

(10) Patent No.: US 6,675,004 B1
(45) Date of Patent: Jan. 6, 2004

(54) METHOD AND APPARATUS FOR RECEIVE CHANNEL NOISE SUPPRESSION

(75) Inventor: Nicholas S. Waylett, Newark, CA (US)

(73) Assignee: Interwave Communications International Ltd., Hamilton (BM)

( * ) Notice: Subject to any disclaimer, the term of this patent is extended or adjusted under 35 U.S.C. 154(b) by 0 days.

(21) Appl. No.: 09/648,259

(22) Filed: Aug. 25, 2000

(51) Int. Cl.$^7$ ................................................ H04B 1/10
(52) U.S. Cl. ........................ 455/304; 455/296; 455/306
(58) Field of Search ................................ 455/296, 298, 455/310, 303, 315, 209, 306, 307, 313, 317, 318, 324, 207, 256, 305, 278.1, 304, 285, 284, 283

(56) References Cited

U.S. PATENT DOCUMENTS

| | | | | |
|---|---|---|---|---|
| 2,692,332 A | * | 10/1954 | Godbey | 455/313 |
| 2,964,622 A | * | 12/1960 | Fire | 455/302 |
| 3,070,747 A | * | 12/1962 | Addleman | 455/308 |
| 3,432,765 A | * | 3/1969 | Gottfried | 330/126 |
| 4,152,652 A | * | 5/1979 | Taylor et al. | 455/226.2 |
| 4,177,430 A | * | 12/1979 | Paul | 455/306 |
| 4,181,892 A | * | 1/1980 | Dilley | 327/552 |
| 4,554,679 A | * | 11/1985 | Schiff | 455/203 |
| 4,718,113 A | * | 1/1988 | Rother et al. | 455/209 |
| 4,731,875 A | * | 3/1988 | Mizukami et al. | 455/302 |
| 4,864,643 A | * | 9/1989 | French et al. | 455/302 |
| 5,134,723 A | * | 7/1992 | Carson | 455/254 |
| 5,507,036 A | * | 4/1996 | Vagher | 455/295 |
| 5,542,114 A | * | 7/1996 | Kojima et al. | 455/196.1 |
| 5,678,220 A | * | 10/1997 | Fournier | 455/302 |
| 5,870,670 A | * | 2/1999 | Ripley et al. | 455/304 |
| 6,029,059 A | * | 2/2000 | Bojer | 455/326 |
| 6,148,181 A | * | 11/2000 | Otaka | 455/86 |
| 6,151,373 A | * | 11/2000 | Dodley | 375/348 |
| 6,192,225 B1 | * | 2/2001 | Arpaia et al. | 455/196.1 |
| 6,314,279 B1 | * | 11/2001 | Mohindra | 455/304 |
| 6,529,719 B1 | * | 3/2003 | Imbornone et al. | 455/302 |

FOREIGN PATENT DOCUMENTS

JP       403195134       * 8/1991

* cited by examiner

Primary Examiner—Charles Appiah
(74) Attorney, Agent, or Firm—Dorsey & Whitney, LLP

(57) ABSTRACT

A noise suppression apparatus for use in a receiver includes an input terminal adapted to receive an inbound signal. A channel splitter is coupled to the input terminal and configured to split the inbound signal into a substantially identical first signal and second signal. A first mixer coupled to the channel splitter and configured to receive the first signal, and a second mixer coupled to the channel splitter and configured to receive the second signal. A first local oscillator is coupled to the first mixer and configured to generate a first LO frequency signal, and a second local oscillator coupled to the second mixer and configured to generate a second LO frequency signal, where the first LO frequency signal and second LO frequency signal differ from one another. The first mixer is configured to mix the first signal with the first LO frequency signal to create a first mixed signal, and the second mixer is configured to mix the second signal with the second LO frequency signal to create a second mixed signal. A combiner is coupled to the first mixer and the second mixer and configured to combine the first mixed signal with the second mixed signal to create a noise suppressed output signal. Advantages of the invention include a high quality signal with an improved signal-to-noise ratio.

28 Claims, 5 Drawing Sheets

METHOD AND APPARATUS FOR RECEIVE CHANNEL NOISE SUPPRESSION

FIELD

The present invention relates to noise suppression systems in receivers generally, and cellular radio communication systems in particular.

BACKGROUND

Conventional radio receivers are well known in the art, as well are many associated noise problems. Noise problems can be categorized into externally generated noise and internally generated noise. Externally generated noise is typically associated with interference from other radio frequency sources such as other radios, electrical equipment, etc. Internally generated noise is typically associated with thermal noise, electrical incompatibility between internal components, etc.

A major problem with the introduction of noise is that it degrades the signal clarity and can prevent the radio receiver from identifying and filtering out the desired signals. In fact, signal clarity decreases in direct proportion to the amount of noise. There are conventionally known techniques for reducing externally generated noise by, for example, using multiple antennas typically called a diversity configuration. Each antenna receives roughly the same externally generated noise, so the received signals are fed through a noise cancellation system to filter out the desired signal. While this method can cancel external noise it does not address internal noise.

Internally generated noise can often be difficult to identify and suppress. A leading source of internally generated noise is thermal noise that is generated within the radio receiver by components such as filters and amplifiers. Thermal noise is inherent in electronics and arises from the random movement of electrons within and between electrical components, which makes thermal noise difficult to identify and suppress. To date, conventional radio receivers have not provided efficient techniques for identifying and suppressing such noise.

What is needed is a technique for identifying and suppressing both external and internal noise while maintaining the integrity of desired the signal.

SUMMARY

The present invention relates to noise suppression systems in receivers. Exemplary embodiments are provided for use in cellular radio communication systems, but the invention is applicable to any type of receiver.

A noise suppression apparatus for use in a receiver includes an input terminal adapted to receive an inbound signal. A channel splitter is coupled to the input terminal and configured to split the inbound signal into a substantially identical first signal and second signal. A first mixer coupled to the channel splitter and configured to receive the first signal, and a second mixer coupled to the channel splitter and configured to receive the second signal. A first local oscillator is coupled to the first mixer and configured to generate a first LO frequency signal, and a second local oscillator coupled to the second mixer and configured to generate a second LO frequency signal, where the first LO frequency signal and second LO frequency signal differ from one another. The first mixer is configured to mix the first signal with the first LO frequency signal to create a first mixed signal, and the second mixer is configured to mix the second signal with the second LO frequency signal to create a second mixed signal. A combiner is coupled to the first mixer and the second mixer and configured to combine the first mixed signal with the second mixed signal to create a noise suppressed output signal.

In one aspect of the exemplary embodiment, a reference signal generator is coupled to the first local oscillator and the second local oscillator. Bandpass filters may also be disposed between the mixers and the combiner to filter the first mixed signal and the second mixed signal. In another aspect of the exemplary embodiment, an analog to digital convertor is coupled to the input terminal, and the first mixer, second mixer, and combiner are structured in a digital signal processor.

Another exemplary embodiment of a noise suppression apparatus for use in a receiver, includes an input terminal adapted to receive an inbound signal. A mixer is coupled to the input terminal and configured to receive the inbound signal. A local oscillator is coupled to the mixer and configured to generate a LO frequency signal. The mixer is coupled to the first local oscillator and configured to mix the inbound signal with the LO frequency signal to create a mixed signal. A channel splitter is coupled to the mixer and configured to split the mixed signal into a substantially identical first signal and second signals. A combiner is coupled to the first mixer and the second mixer and configured to combine the first signal with the second signal to create a noise suppressed output signal.

In one aspect of the second exemplary embodiment, bandpass filters may also be disposed between the splitter and the combiner to filter the first signal and the second mixed signal to suppress noise. In another aspect of the exemplary embodiment, an analog to digital convertor is coupled to the input terminal, and the splitter, bandpass filters and combiner are structured in a digital signal processor.

Advantages of the invention include a high quality signal with an improved signal-to-noise ratio.

BRIEF DESCRIPTION OF THE DRAWINGS

Additional advantages of the invention will become apparent upon reading the following detailed description and upon reference to the drawings, in which.

DETAILED DESCRIPTION

Exemplary embodiments are described herein with reference to specific structures, configurations and designs. Those skilled in the art will appreciate that various changes and modifications can be made to the embodiments while remaining within the scope of the present invention. For example, while the exemplary embodiments refer to radio receivers, the invention is applicable to all types of receivers.

Figure 1:
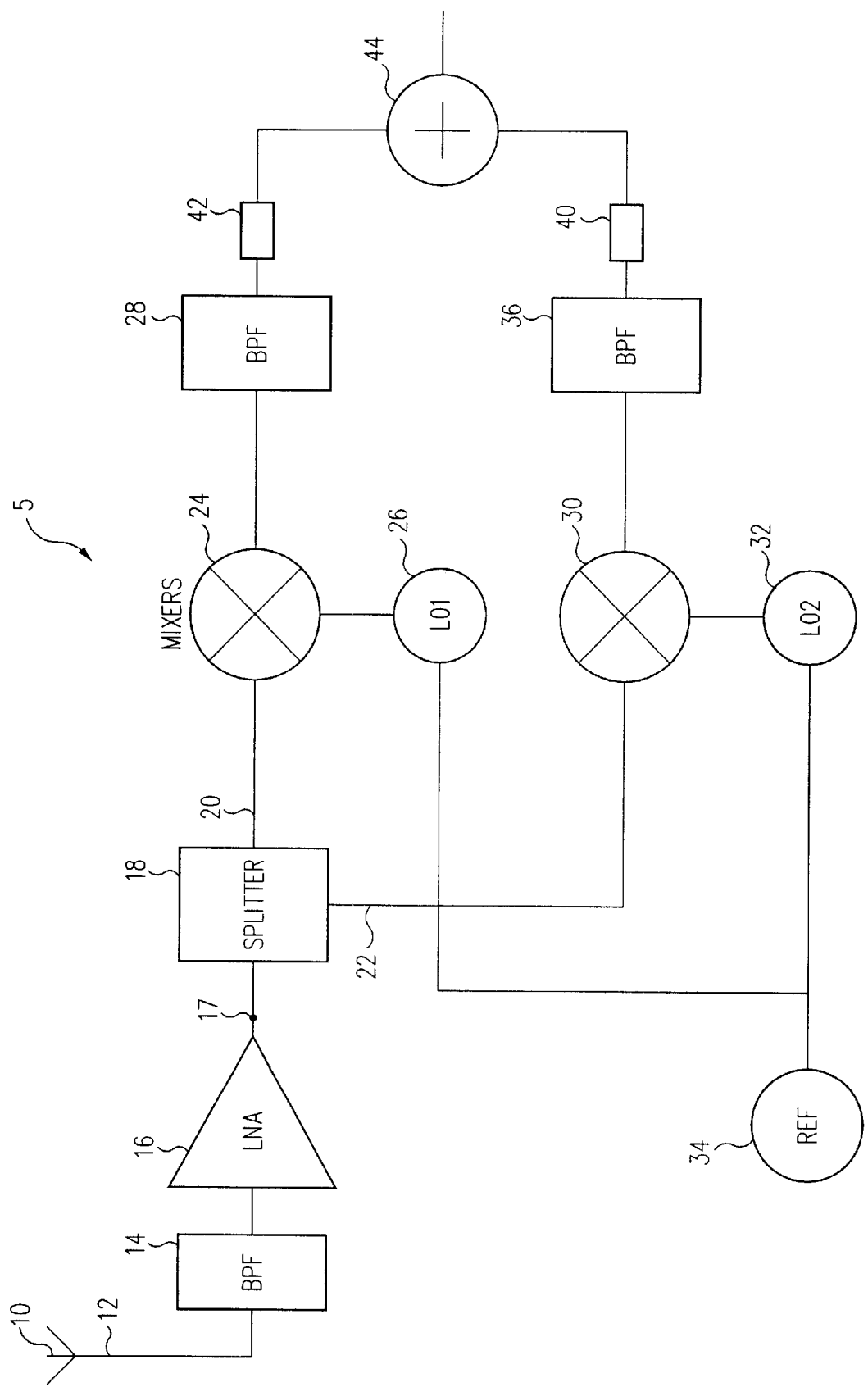
FIG. 1 depicts a first exemplary embodiment of a noise suppression apparatus for use in a cellular radio.
Figure 2:
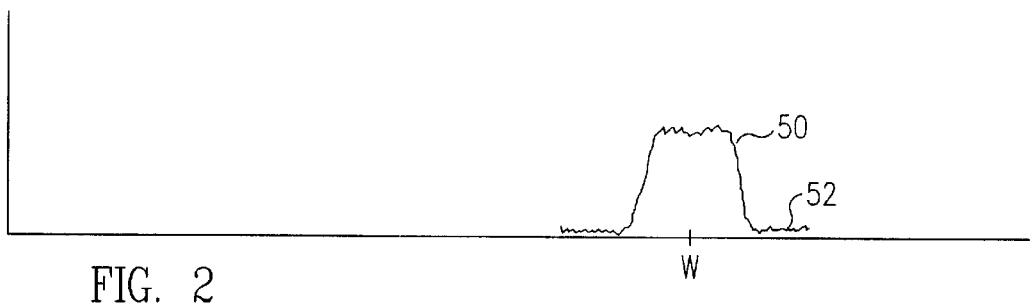
FIG. 2 shows the inbound signal with noise.

FIG. 1 depicts a radio receiver having a noise suppression apparatus 5 according to the invention. Antenna 10 receives an inbound signal that contains a desired signal that may be distorted from externally generated noise such as background radiation and path losses over the distance traveled. The inbound signal travels through antenna downfeed cable 12 to a bandpass filter 14 which in turn passes a predetermined frequency range including the frequency of interest. The signal from bandpass filter 14 is applied to an amplification stage using low noise amplifier (LNA) 16. However, even with good filter and amplifier design, the signal is inevitably distorted with internally generated noise such as thermal noise. For example, FIG. 2 shows an inbound signal 50 with internal and external noise. The noise is shown as 52 and is superimposed on the desired signal. One of the goals of the invention is to suppress, remove or reduce the internal and external noise.

Figure 3:
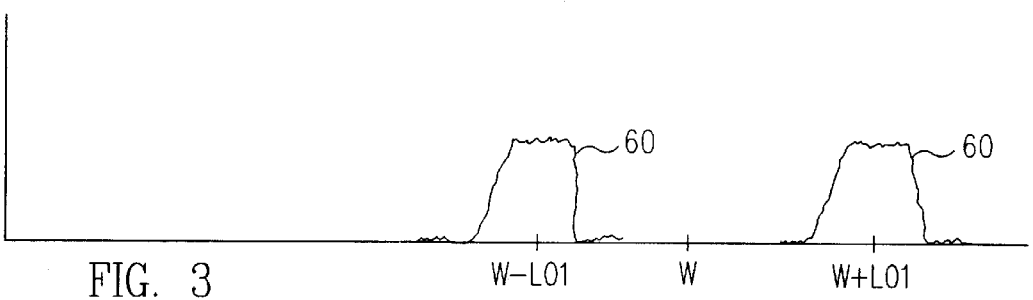
FIG. 3 shows the first signal that has been mixed with LO1.

Referring to FIG. 1, the noise suppression structure begins at a terminal 17 where the inbound signal is delivered from the LNA 16. A channel splitter 18 is coupled to the input terminal 17 and configured to split the inbound signal into substantially identical first signal and second signals. A first channel 20 carries the first signal to a first mixer 24. The mixer 24 also receives a first local oscillator signal from a first local oscillator 26 defined as LO1 and converts the first signal to a first mixed signal by mixing the first signal and the LO1 signal. FIG. 3 shows the first mixed signal 60 from first mixer 24, centered at W−LO1 and W+LO1. After mixing, the first mixed signal is sent to a first bandpass filter 28 to pass the frequency range of the first mixed signal 60 to the frequencies containing desired information.

Figure 4:
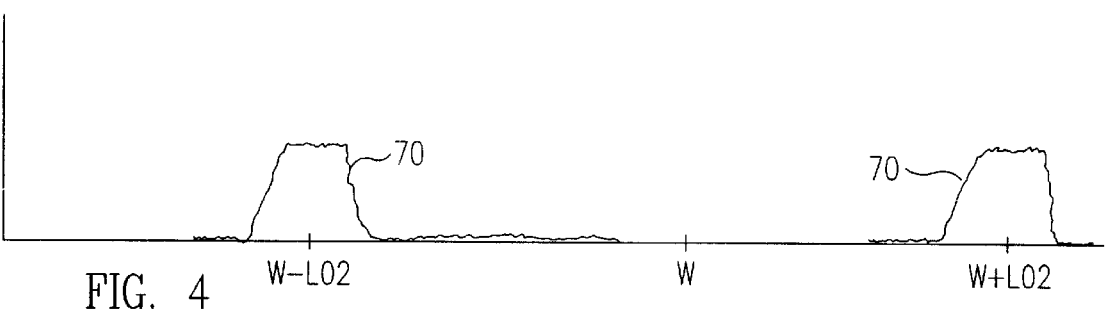
FIG. 4 shows the second signal that has been mixed with LO2.

A second channel 22 carries the second signal to a second mixer 30. The second mixer 30 also receives a second local oscillator signal from a second local oscillator 32 defined as LO2 and converts the second signal to a second mixed signal by mixing the second signal and the LO2 signal, which differs from LO1. The second local oscillator 32 is offset in frequency from the LO1 signal, and both the LO1 and LO2 are coupled to a common reference clock 34 to insure that they are both phase locked to the common clock. The offset in frequency is close enough to the frequency of the data to ensure that the output signal from the first mixer 24 has noise close in spectral density to the output signal from the second mixer 30. Second bandpass filter 36 should block data from the offset frequency in order to ensure that there is only noise in second mixed signal channel 22 at W−LO1. If data through the offset frequency range is not blocked by second bandpass filter 36 then interference results when the signals in the first channel 20 and second channel 22 recombine. In one example the offset in frequency is to the nearest adjacent RF channel. In another example, the offset between LO1 and LO2 is approximately 0.1% of the input signal frequency. FIG. 4 shows the second mixed signal 70 from mixer 30, centered at W−LO2 and W+LO2. After mixing, the second mixed signal is sent to a second bandpass filter 36 to narrow the frequency range of the second mixed signal to the same band as the first mixed signal, which are the frequencies containing desired information. The second channel 22 preferably has characteristics similar to the first channel 20, and the signal preferably matches in phase the signal in the first channel 20.

Figure 5:
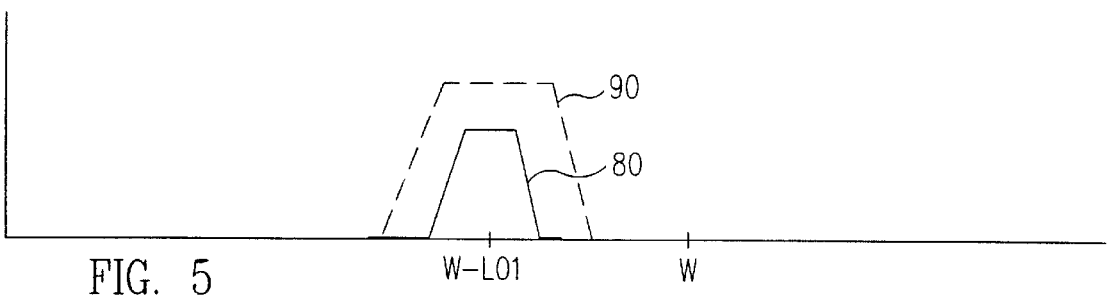
FIG. 5 shows the bandpass filter characteristics and the signal of FIG. 4 subtracted from the signal of FIG. 3 after passing through the bandpass filters.

A combiner 44 is coupled to the first and second mixers. In this embodiment combiner 44 is configured to subtract the second mixed signal (noise) from the first mixed signal (desired signal+noise) to create an noise suppressed output signal. FIG. 5 shows the resultant signal 80 from subtracting the second signal 70 from the first signal 60. FIG. 5 also shows the bandpass filter cutoff frequencies as depicted by reference number 90.

In one aspect of the invention, a phase shifting structure 40 and potentially a second phase shifting structure 42 can be disposed in the channels 20 and 22 to adjust the respective signals. In one example, the phase shift structure 40 is configured to shift the phase of the second mixed signal approximately 180 degrees in phase to create a second phase-shifted signal. The phase referred to by the phase shifting structure is the phase of the noise component of the first signal. The phase shifting structure can be a phasing stub, delay line or other structure. Optionally, a second phase shifting structure 42 can be employed if desired. In this case, the phase shifting structure creates a second phase-shifted signal from the second mixed signal. The noise in the second phase-shifted signal is the complement of the noise in the first mixed signal. Accordingly, when the second phase-shifted signal is added to the first mixed signal, the result is a clean desired signal. The waveform shown in FIG. 5 can also be achieved in this manner.

In another aspect, phase shifting structure 40 and potentially a second phase shifting structure 42 fine tune the phase of the signals in their respective channels. Fine tuning the phase of the signals corrects the offset in signal frequency between first and second channels 20 and 22. Combiner 44 can be configured to either add or subtract the second mixed signal from the first mixed signal based on the desired outcome, and the phase shifting structures 40 and 42 can be tuned for optimal noise suppression.

Figure 6:
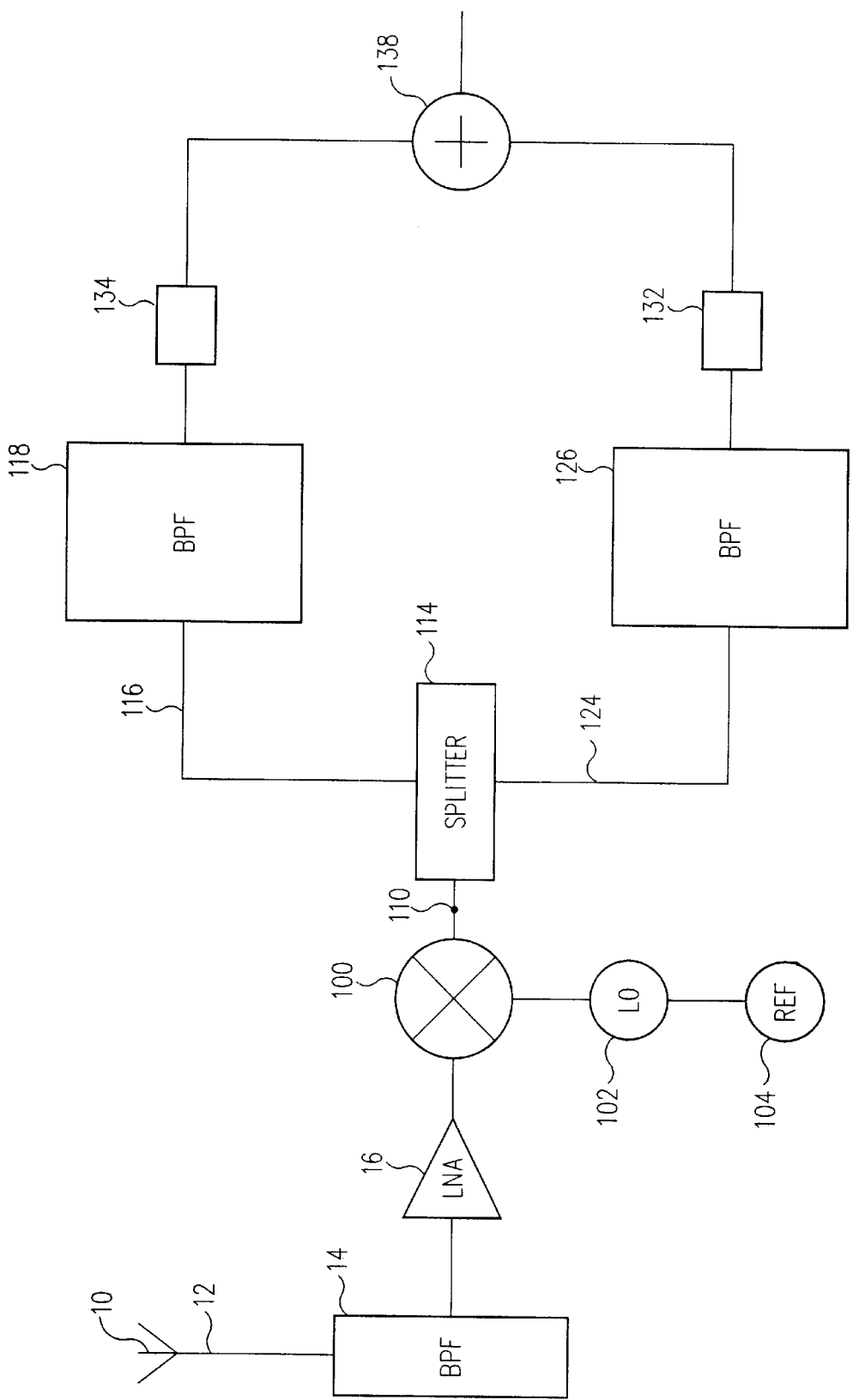
FIG. 6 depicts a second exemplary embodiment of a noise suppression apparatus for use in a cellular radio.

FIG. 6 depicts a second exemplary embodiment of the invention. While the first embodiment split and mixed the inbound signal to different frequencies (LO1 and LO2) to separate the noise, this embodiment mixes the inbound signal with one LO frequency and then splits and filters the signals.

Figure 7:
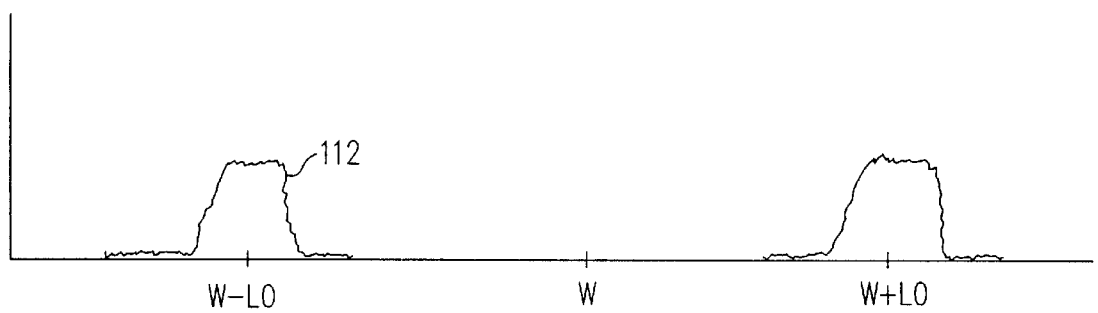
FIG. 7 shows the inbound signal mixed with LO.

Antenna 10 receives the inbound signal and then it travels through downfeed cable 12 into bandpass filter 14 and then to low-noise amplifier 16 and to mixer 100. A local oscillator 102 is driven by a reference clock 104 and provides the local oscillator signal LO to the mixer 100. The mixer then mixes the inbound signal centered at frequency W to the desired frequency range W−LO. FIG. 7 shows the signal 112 mixed to W−LO and W+LO.

Figure 8:
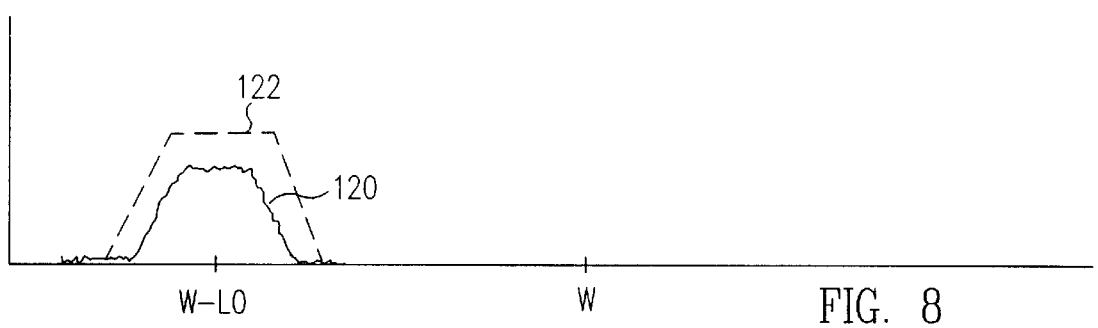
FIG. 8 shows bandpass filter characteristics, the desired information signal, and noise.
Figure 9:
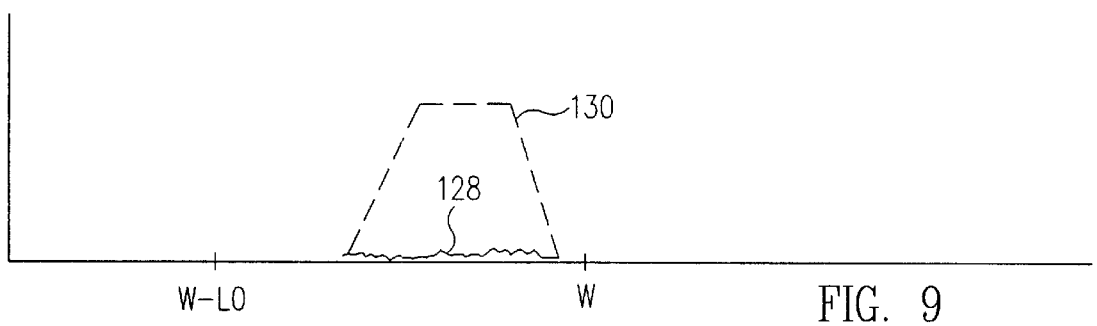
FIG. 9 shows bandpass filter characteristics and noise from a frequency near W–LO.
Figure 10:
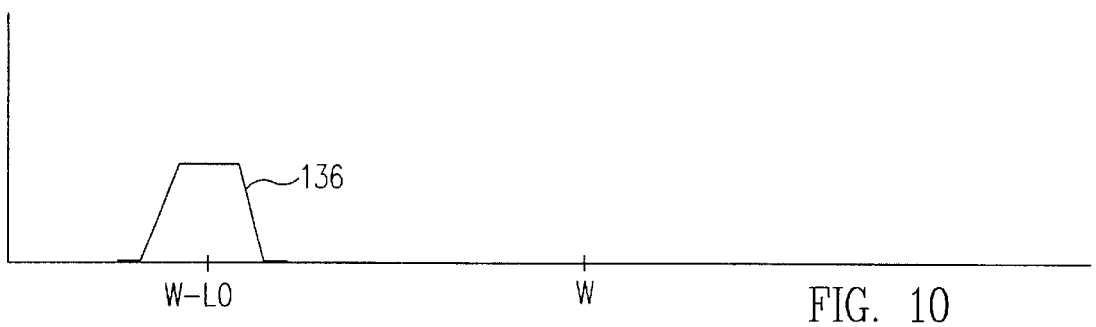
FIG. 10 shows the information signal of FIG. 8 after subtracting the noise from FIG. 9.

The noise suppression apparatus begins at input terminal 110, which is coupled to channel splitter 114. Splitter 114 is configured to split the inbound signal into substantially identical first signal and second signals. A first channel 116 carries the first signal to a first bandpass filter 118. FIG. 8 shows the first signal 120 from first bandpass filter 118, and reference numeral 122 identifies the first bandpass filter range. A second channel 124 carries the second signal from splitter 114 to second bandpass filter 126. The first and second bandpass filters 118 and 126 are offset from one another to isolate the first signal and the second signal. The offset in frequency is close enough to the frequency of the data to ensure that the output signal from the second bandpass filter 126 has noise close in spectral density to the output signal from the first bandpass filter 118. If data through the offset frequency range is not blocked by second bandpass filter 126 then interference results when the first signal and the second signal recombine. In one example the offset in frequency is to the nearest adjacent receiver (e.g. RF) channel. In another example, the offset between bandpass filters 126 and 118 is approximately 0.1% of the input signal frequency. Once the noise is isolated it is subtracted from the information signal at combiner 138. In one aspect of the invention, a phase shift structure 132 is used to phase shift the second signal, which then cancels the noise when added to the first signal in combiner 138. If desired, a second shift structure 134 can be employed to tune the signals into the combiner 138.

Figure 11:
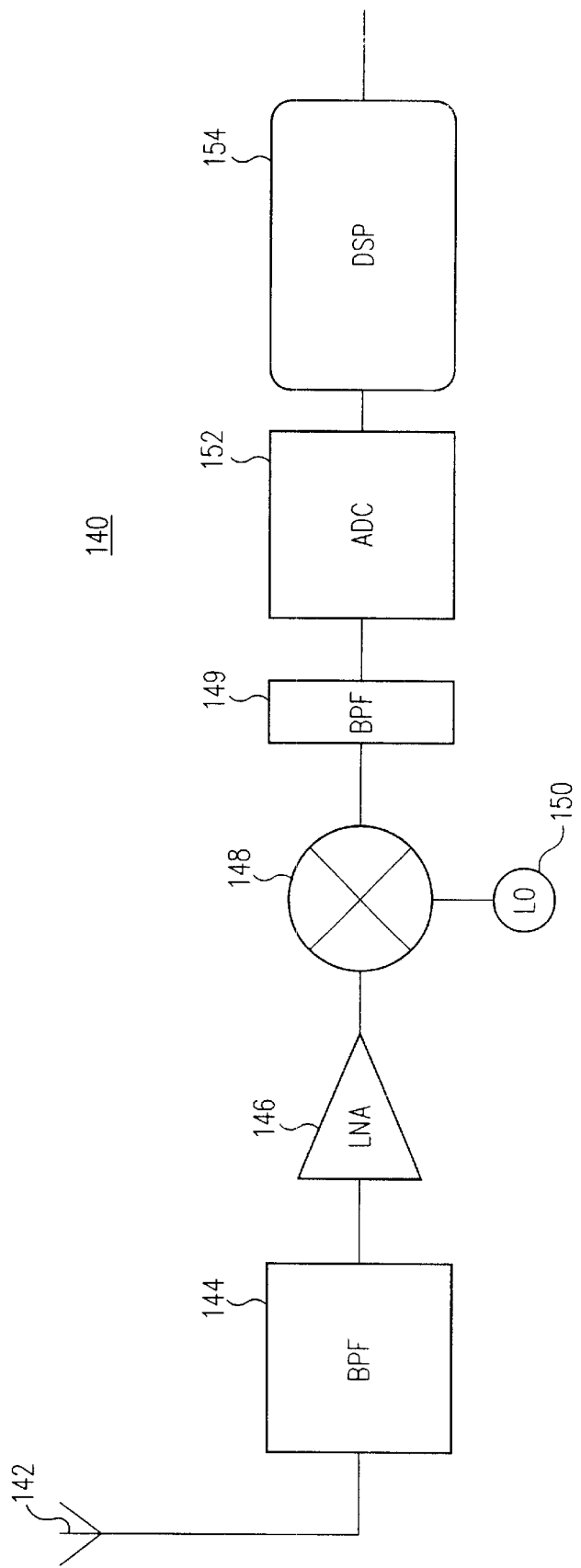
FIG. 11 depicts a noise suppression apparatus employing a digital signal processor according to an embodiment of the invention.

The invention can also be implemented in digital circuits. FIG. 11 shows a schematic for a digital receive channel noise suppression device 140. Antenna 142 receives a signal that feeds through bandpass filter 144 and then to low noise amplifier (LNA) 146. Mixer 148 receives the inbound signal and a the local oscillator (LO) 150 signal to down-convert the inbound signal to a frequency range which can be digitally sampled. The inbound signal from the mixer 148 is passed through a second bandpass filter 149 in order further isolate the desired information signal, which is then sampled by analog-to-digital converter (ADC) 152. In an exemplary embodiment, the ADC is a 12 bit A/D with a 300 MHz sampling frequency. The sampled signal is delivered to digital signal processor (DSP) 154 for processing. The DSP performs algorithms equivalent to those that are described above in the prior exemplary embodiments.

Advantages of the invention include a high quality signal with an improved signal-to-noise ratio. Having disclosed exemplary embodiments and the best mode, modifications and variations may be made to the disclosed embodiments while remaining within the scope of the present invention as defined by the following claims.

What is claimed is:

1. A noise suppression apparatus for use in a receiver, comprising:
    an input terminal adapted to receive an inbound signal comprising a desirable signal component and an internal noise component;
    a channel splitter coupled to the input terminal and configured to split the inbound signal into a substantially identical first signal and second signal;
    a first mixer coupled to the channel splitter and configured to receive the first signal, and a second mixer coupled to the channel splitter and configured to receive the second signal;
    a first local oscillator coupled to the first mixer and configured to generate a first LO frequency signal, and a second local oscillator coupled to the second mixer and configured to generate a second LO frequency signal, where the first LO frequency signal and second LO frequency signal differ from one another by an offset in frequency;
    wherein the first mixer is coupled to the first local oscillator and configured to mix the first signal with the first LO frequency signal to create a first mixed signal, and the second mixer is coupled to the second local oscillator and configured to mix the second signal with the second LO frequency signal to create a second mixed signal;
    a first bandpass filter coupled to the first mixer having a first passband frequency range and configured to generate a first filtered signal;
    a second bandpass filter coupled to the second mixer having a second passband frequency range and configured to generate a second filtered signal;
    wherein said first LO frequency signal, said second LO frequency signal, and said first and second passband frequency ranges are selected such that said first filtered signal comprises said desirable signal component and said second filtered signal consists essentially of said internal noise component;
    a first phase shifting structure coupled to the second bandpass filter and configured to shift the phase of the second filtered signal approximately 180 degrees from the phase of the second filtered signal to create a phase-shifted second filtered signal;
    a second phase shifting structure coupled to the first bandpass filter and configured to shift the phase of the first filtered signal to create a phase-shifted first filtered signal that corrects for the offset in frequency; and
    a combiner coupled to the first filter and the second filter and configured to combine the phase-shifted first filtered signal with the phase-shifted second filtered signal to generate a noise suppressed output signal having said desirable signal component and wherein said internal noise component is substantially suppressed 2. The noise suppression apparatus of claim 1, further comprising:
    a reference signal generator coupled to the first oscillator and the second local oscillator.

3. The noise suppression apparatus of claim 1, wherein:
    the first and second LO signals differ in frequency sufficiently to prevent the desirable signal component from passing through the second band pass filter.

4. The noise suppression apparatus of claim 1, wherein:
    the first and second LO signals differ in frequency by at least one adjacent channel.

5. The noise suppression apparatus of claim 1, wherein:
    the first and second LO signals differ in frequency by approximately 0.1%.

6. The noise suppression apparatus of claim 1, further comprising:
    an analog to digital convertor coupled to the input terminal; and
    wherein the first mixer, second mixer, first phase shifting structure, second phase shifting structure and combiner are structured in a digital signal processor.

7. The apparatus of claim 1, further comprising:
    a low-noise amplifier coupled to said input port, wherein said internal noise component comprises internal noise generated in said low-noise amplifier.

8. The apparatus of claim 7, further comprising:
    a third filter coupled to said low-noise amplifier, and wherein said internal noise component further comprises internal noise generated in said third filter.

9. A method in a receiver of suppressing noise, comprising the steps of:
    receiving an inbound signal comprising a desirable signal component and an internal noise component;
    splitting the inbound signal into substantially identical first signal and second signals;
    generating a first LO frequency signal and a second LO frequency signal, where the first LO frequency signal and second LO frequency signal differ from one another by an offset in frequency;
    mixing the first signal with the first LO frequency signal to create a first mixed signal, and mixing the second signal with the second LO frequency signal to create a second mixed signal;

filtering the first mixed signal by a first bandpass filter thereby generating a first filtered signal;

filtering the second mixed signal by a second bandpass filter thereby generating a second filtered signal, wherein said second filtered signal consists substantially of said internal noise component and said first filtered signal comprises said desirable signal component;

shifting the phase of the second-filtered signal approximately 180 degrees to create a phase-shifted second filtered signal;

shifting the phase of the first filtered signal to create a phase-shifted first filtered signal that corrects for offset in frequency; and combining the phase-shifted first filtered signal and the phase-shifted second filtered signal to create a noise suppressed output signal having said desirable signal component wherein said internal noise component is substantially suppressed.

10. The method of claim 9, further comprising the step of:

supplying the first local oscillator and the second local oscillator with a common reference signal.

11. The method of claim 9, wherein:

the first and second LO signals differ in frequency sufficiently to prevent inbound signal of interest from passing through the second band pass filter.

12. The method of claim 9, wherein:

the first and second LO signals differ in frequency by at least one adjacent channel.

13. The method of claim 9, wherein:

the first and second LO signals differ in frequency by approximately 0.1%.

14. The method of claim 9, further comprising the step of:

converting the inbound signal from analog to digital; and wherein the mixing steps and combining step are performed by a digital signal processor.

15. The method of claim 14, wherein the phase shifting steps are performed by the digital signal processor.

16. A noise suppression apparatus for use in a receiver, comprising:

an input terminal adapted to receive an inbound signal comprising a desirable signal component and an internal noise component;

a mixer coupled to the input terminal and configured to receive the inbound signal;

a local oscillator coupled to the mixer and configured to generate a LO frequency signal;

wherein the mixer is configured to mix the inbound signal with the LO frequency signal to create a mixed signal;

a channel splitter coupled to the mixer and configured to split the mixed signal into a substantially identical first signal and second signal;

a first bandpass filter coupled to the channel splitter having a first passband frequency range and configured to generate a first filtered signal;

a second bandpass filter coupled to the channel splitter having a second passband frequency range and configured to generate a second filtered signal;

wherein LO frequency signal and said first and second passband frequency ranges are selected such that said first filtered signal comprises said desirable signal component and said second filtered signal consists essentially of said internal noise component;

a first phase shifting structure coupled to the second band pass filter and configured to shift the phase of the second filtered signal approximately 180 degrees to create a phase-shifted second filtered signal;

a second phase shifting structure coupled to the first bandpass filter and configured to fine tune the phase of the first filtered signal to create a phase-shifted first filtered signal that corrects for an offset in phase between the first filtered signal and the second filtered signal; and a combiner coupled to the first bandpass filter and the second bandpass filter and configured to combine the phase-shifted first filtered signal with the phase-shifted second filtered signal to create a noise suppressed output signal having said desirable signal component and wherein said internal noise component is substantially suppressed.

17. The noise suppression apparatus of claim 16, wherein:

the first bandpass filter and second bandpass filter differ in passband frequency sufficiently to prevent the desirable signal component of the inbound signal from passing through the second bandpass filter.

18. The noise suppression apparatus of claim 16, wherein;

the first and second bandpass filters differ in passband frequency by at least one adjacent channel.

19. The noise suppression apparatus of claim 16, wherein:

the first and second bandpass filters differ in passband frequency by approximately 0.1%.

20. The noise suppression apparatus of claim 17, wherein:

the first and second bandpass filters differ in passband frequency by at least one adjacent channel.

21. The noise suppression apparatus of claim 17, further comprising:

an analog to digital convertor coupled to the input terminal; and wherein the mixer, splitter and combiner are structured in a digital signal processor.

22. The noise suppression apparatus of claim 21, wherein the first phase shifting structure and second phase shifting structure are structured in the digital signal processor.

23. The apparatus of claim 16, further comprising:

a low-noise amplifier coupled to said input port, wherein said internal noise component comprises internal noise generated in said low-noise amplifier.

24. The apparatus of claim 23, further comprising:

a third filter coupled to said low-noise amplifier, and wherein said internal noise component further comprises internal noise generated in said third filter.

25. A method in a receiver of suppressing noise, comprising the steps of:

receiving an inbound signal comprising a desirable signal component and an internal noise component;

mixing the inbound signal with an LO frequency signal to create a mixed signal;

splitting the mixed signal into a substantially identical first signal and second signal;

filtering the first mixed signal by a first bandpass filter thereby generating a first filtered signal;

filtering the second signal by a second bandpass filter thereby generating a second filtered signal, wherein said second filtered signal consists substantially of said internal noise component and said first filtered signal comprises said desirable signal component;

shifting the phase of the second filtered signal approximately 180 degrees to create a phase-shifted second filtered signal;

shifting the phase of the first filtered signal to create a phase-shifted first filtered signal that corrects for an offset in phase between the first filtered signal and the second filtered signal; and combining the phase-shifted first filtered signal with the phase-shifted second filtered signal to create a noise suppressed output signal having said desirable signal component and wherein said internal noise component is substantially suppressed.

26. The method of claim 25, wherein:

the first bandpass filter and second bandpass filter differing passband frequency sufficiently to prevent the desirable signal component of said inbound signal from passing through the second band pass filter.

27. The method of claim 25, wherein;

the first and second bandpass filters differ in passband frequency by at least one adjacent channel.

28. The method of claim 25, wherein:

the first and second bandpass filters differ in passband frequency by approximately 0.1%.

* * * * *